S. W. WARDWELL.
CLUTCH DEVICE.
APPLICATION FILED JUNE 7, 1913.
1,118,605.
Patented Nov. 24, 1914.
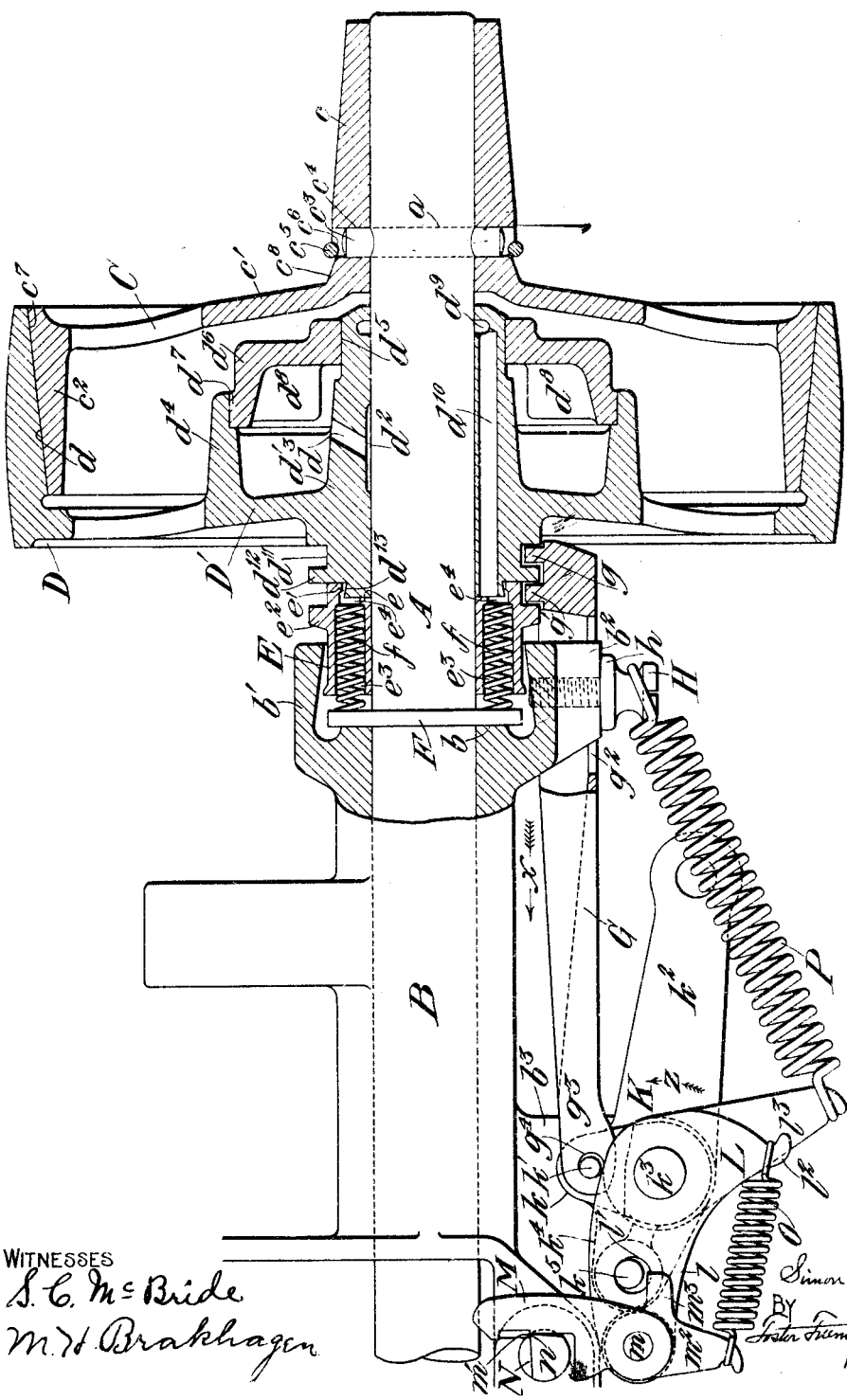

UNITED STATES PATENT OFFICE.

SIMON W. WARDWELL, OF PROVIDENCE, RHODE ISLAND, ASSIGNOR TO WARDWELL BRAIDING MACHINE COMPANY, OF PORTLAND, MAINE, A CORPORATION OF MAINE.

CLUTCH DEVICE.

1,118,605.  Specification of Letters Patent.  Patented Nov. 24, 1914.

Application filed June 7, 1913. Serial No. 772,431.

*To all whom it may concern:*

Be it known that I, SIMON W. WARDWELL, a citizen of the United States, residing at Providence, in the county of Providence and State of Rhode Island, have invented certain new and useful Improvements in Clutch Devices, of which the following is a specification.

My invention relates to clutch-devices and consists of certain improvements in the construction and arrangement of the mechanism thereof.

The object of my improvement is to simplify the structure of the mechanism; to render it more efficient in operation; and to relieve the operating parts of undue friction and wear.

The invention is fully set forth in the following specification, illustrated by the accompanying drawing, in which like letters of reference designate like parts.

The single figure of the drawing is a plan view illustrating my device applied to a driving-shaft and showing the clutch-element and its coöperating driving-member in section on a plane passing through the axis of the shaft.

My improved clutch-mechanism is especially adapted for use on braiding machines such, for instance, as that shown and described in my United States Patent No. 1,008,504, dated Nov. 14, 1911, and particularly in connection with the stopping- and braking-devices set forth in my pending application, Serial No. 615,076, filed Mar. 17, 1911. It is to be understood, however, that my new device might be applied to other machines besides braiders and therefore I do not herein limit myself to the exact use as above mentioned.

Referring to the drawings, A designates a driving-shaft arranged to rotate in a bearing B and adapted to drive the machine to which it is connected through suitable transmission-mechanism not here shown or described. Mounted on the end of the shaft A is a clutch-member C formed with a hub $c$ bored to receive the shaft and having a web $c'$ supporting the annular rim $c^2$. The clutch C may be fastened on the shaft A in any suitable manner, but as here shown is held rotatively therewith by means of a pin $c^3$ extending through a transverse hole $c^4$ in the hub $c$ and a corresponding hole $a$ in the shaft. A split spring-ring $c^5$ encircles the hub $c$ in line with the hole $c^4$ and is held in a suitable groove $c^6$ scored on the periphery of the hub. The ring $c^5$ serves to normally prevent displacement of the pin $c^3$, but can be sprung out of its groove to allow the removal of the pin so that the clutch may be taken off the shaft when necessary. It will be noted that the hub $c$ is turned down at $c^8$ to form a beveled shoulder adjacent one side of the groove $c^6$. This provides a sort of ledge adapted to receive the ring $c^5$ when the latter is sprung out of the groove $c^6$ and the ring can thus be held away from the hole $c^4$ without removing it from the hub while the pin $c^3$ is being extracted or put back into place. The rim $c^2$ of the clutch C is formed with a tapered face $c^7$ adapted to engage with a correspondingly-tapered interior face $d$ on the driving-member D.

The driving-member D is here shown as taking the form of a belt-pulley but it is obvious that it might be constructed as a gear, friction-wheel or other similar rotatable element. The pulley D is mounted rotatably on the shaft A between the clutch C and the bearing B. The bore of its hub $d'$ is preferably provided with oil-pockets $d^2$ having radial holes $d^3$ leading therefrom to the periphery of the hub. Formed as a part of the web D' of the pulley is an overhanging, annular flange $d^4$ surrounding the hub $d'$. The end of the hub $d'$ is turned down at $d^5$ and a flanged cap $d^6$ is driven on to this reduced portion with its rim $d^7$ fitted to the flange $d^4$. The cap $d^6$ has a number of radial blades $d^8$ in its interior and these act to lead the oil into the holes $d^3$. When the parts are assembled oil is placed in the reservoir formed by the flange $d^4$ and cap $d^6$ and while the pulley is rotating centrifugal force will tend to throw the oil outward toward the circumferential wall of the reservoir. The blades $d^8$ then serve to break up this ring of oil and act to lead it toward the hub of the pulley so that it drips gradually onto the outside of the hub $d'$ and thence drains through the holes $d^3$ into the pockets $d^2$. In this way a thin film of oil is maintained in the bore of the hub $d'$ so that its bearing is kept thoroughly lubricated during the free rotation of the pulley on the shaft A. At the outer end of the hub $d'$ is an annular groove or pocket $d^9$ in which the surplus oil leaching along the shaft A accumulates, centrifugal action preventing it from escaping at the end of the hub. Longitudinal holes $d^{10}$ leading through the hub $d'$ and into the pocket $d^9$ serve to drain the surplus oil back to the opposite end of the hub $d'$ where it is utilized to lubricate a sleeve or bushing E arranged adjacent the hub.

The end of the hub $d'$ adjacent the sleeve E is constructed with a peripheral groove $d^{11}$ forming an annular flange $d^{12}$. Beyond the flange $d^{12}$ the hub $d'$ is turned down to form a beveled groove $d^{13}$ surrounding the extreme end of the hub. Mounted free to turn on the shaft A and abutting the hub $d'$ is the sleeve or bushing E which is counterbored at $e$ to receive the outwardly-beveled end of the hub $d'$. An interior flange $e'$ at the end of the counterbore $e$ overlaps the groove $d^{13}$ on the end of the hub $d'$ and acts to prevent the escape of oil at this point, the natural tendency being for the oil to work outward from the groove $d^{13}$ to the point of greatest diameter on the hub. The periphery of the sleeve E is formed with an annular flange $e^2$ of approximately the same diameter as the flange $d^{12}$ on the pulley-hub $d'$ and is spaced at a slight distance therefrom. Extending longitudinally into the sleeve E are a plurality of holes $e^3$, preferably six in number, which form pockets adapted to receive the coiled springs $f$. The holes $e^3$ are bored into the sleeve E to within a slight distance of the counterbore $e$ and holes $e^4$ of slightly less diameter lead therefrom into the counterbore so as to form continuous channels extending longitudinally of the sleeve. These channels serve to drain off the surplus oil leading back through the longitudinal holes $d^{10}$ in the pulley-hub $d'$ and distribute it to the opposite end of the bearing of the sleeve E. The springs $f$ bottom in the ends of the larger holes $e^3$ with their opposite extremities bearing against a washer F abutting the end of the bearing B. Preferably, the bearing B is formed with a boss $b$, which takes the thrust of the washer F, and a hood or cowl $b'$ encircles the boss and surrounds the sleeve E throughout a portion of its length. The cowl $b'$ is formed with its interior wall tapering radially outward, rearwardly from the end of its opening to provide a sort of trough or drip-cup to catch the surplus oil which drains through the holes $e^3$. The cowl $b'$ also acts as a spatter-guard to prevent the oil from being thrown outward through centrifugal action when the sleeve E is rotating rapidly.

The pulley D is normally maintained in engagement with the clutch C through the action of the springs $f$ which tend to force the sleeve E against the end of its hub $d'$. To release the pulley from engagement with the clutch I provide means for sliding it on the shaft A in the direction indicated by the arrow $x$. These means consist essentially of a sliding arm G formed with lateral projections or lugs $g$, $g'$ adapted to engage respectively with the flange $d^{12}$ on the pulley-hub $d'$ and the flange $c^2$ on the sleeve E. The lugs $g$, $g'$ are spaced at a slightly greater distance apart than the distance between the engaging faces of the flanges $d^{12}$ and $e^2$ so that when the arm G is moved in the direction indicated by the arrow $x$ the lug $g'$ will come into engagement with the flange $e^2$ on the sleeve E before the lug $g$ engages the flange $d^{12}$ on the pulley-hub. The purpose of this arrangement is described later in connection with the explanation of the method of operation of the device.

The arm G is formed with a slotted opening $g^2$ which acts as a guideway or bearing to receive a lug $b^2$ extending from the side of the main bearing B. A stud or screw H screwed into the lug $b^2$ is formed with a head $h$ of greater diameter than the width of the slot $g^2$ and serves to maintain the arm G in position on its bearing lug. The opposite end of the arm G is formed with a head $g^3$ overlying one arm $k$ of a lever K, to which it is loosely connected by means of a pin $k'$ extending through the enlarged hole $g^4$. Another arm $k^2$ of the lever K is adapted to be connected with the manually-operated starting-lever of the machine through means of a link, cord or other arrangement not here shown or described. The lever K is pivoted on a stud or pin $k^3$ extending upwardly from a bracket $b^3$ which projects laterally from the bearing B. The lever K has a third arm $k^4$ which carries an upwardly-extending pin $k^5$. Pivoted on the pin $k^3$ above the lever K is a second lever L formed with an arm $l$ having a hole $l'$ through which the pin $k^5$ extends, it being noted that the diameter of the hole is greater than that of the pin to provide a clearance between the two. Pivoted on a pin $m$ at the end of the arm $l$ is a detent-lever or latch M formed with a shoulder $m'$ adapted to engage the corresponding shoulder $n$ of a pin N driven into the bearing B. The latch M is formed with a tail-piece $m^2$ to which is fastened one end of a coiled spring O having its opposite end fastened to the end of an arm $l^2$ on the lever L. The latch M also has a lug $m^3$ adapted to be engaged by the pin $k^5$ on the lever K. The lever L also has a third arm $l^3$ to the end of which is attached a spring P, the latter having its opposite end hooked around the head of the stud H in the bearing-lug $b^2$. The spring P tends to swing the upper L in the direction indicated by the arrow $z$ and through the engagement of the side of the hole $l'$ with the pin $k^5$ acts to move the lever K in the same direction. The latch M is held in engagement with the detent pin N by its spring O and when so locked acts to preas follows: [faded text] the rotation of the driving shaft A, and thereby the rotation of the [faded] on which it is mounted, the lever K is moved in the direction opposite to that indicated by the arrow $x$ in the drawing. The arm $k^2$ of the lever K, carrying the pin $k^3$, will then act through the latter to move the lever L in the same direction and the arm G will be moved in the direction opposite to that indicated by the arrow $x$. This movement of the arm G carries its lugs $g'$ and $g^2$ away from the flanges $d^{12}$ and $e^2$ on the hub $d'$ and sleeve E, as illustrated in the drawing, and the spring $f$, acting through the sleeve E, forces the driving-pulley D into engagement with the clutch C. During this movement of the lever K, while the driving-pulley is being released, the detent lever or latch M is carried into position to allow its shoulder $m'$ to engage the shoulder $n$ on the lock pin N, such engagement being effected by the action of the spring O. The engagement of the latch M with the lock-pin N holds the lever L against the tension of its spring P and it will be noticed that the lugs $g'$ and $g^2$ are then entirely clear of the flanges $d^{12}$ and $e^2$ so that the pulley D and sleeve E are free to rotate without frictional contact with the arm G. The slight play of the pin $k^3$ in the hole $g^4$ of the arm G provides for this clearance and maintains the arm in floating relation to the sleeve and pulley. The sleeve E, pulley D and clutch C will now rotate as a unit with the shaft A while the pulley is being driven from its belt and the machine will be operated therefrom.

When it is desired to arrest the rotation of the shaft A, around control the lever K is moved in the direction indicated by the arrow $x$ through its movement heretofore referred to, but not illustrated in the drawing. The first part of the movement of the lever K in this direction will carry the pin $k^3$ against the lug $m^2$ on the latch M and the latter will be rocked thereby to release its shoulder $m'$ from the lock-pin N. The unlocking of the latch M allows the lever L to be moved under action of its spring P and through the engagement of the lever L with the pin $k^3$ the lever K is moved to slide the arm G in the direction indicated by the arrow $x$. This movement of the arm G acts first to engage the lug $g'$ with the flange $e^2$ on the sleeve E and the latter is moved to compress the spring $f$ and carry the sleeve away from the hub of the pulley D. The movement of the sleeve E is continued until the lug $g'$ strikes the flange $d^{12}$ on the hub of the pulley D and then the pulley is moved away from engagement with the clutch C.

It has been before explained that when the parts are in operative relation, as illustrated in the drawing, there is slightly more clearance between the lug $g'$ and flange $d^{12}$ than between the lug $g'$ and flange $e^2$ and it will now be seen that the purpose of this is to hold the sleeve E away from the hub of the pulley D while the shaft A is at rest. This provides that when the rotation of the shaft A is arrested the sleeve E will remain stationary therewith, there being no tendency to rotate it from the rotation of the pulley, and hence the constant rotation of the pulley will have no effect to cause wear on the sleeve.

My new device is extremely simple in construction, but much more efficient than the usual clutch-mechanisms employed for like purposes. It will be noted that means are provided for maintaining a constant lubrication of the continuously-rotated driving-member or pulley D and therefore this member will be subjected to very slight wear. Furthermore, through the novel arrangement of the controlling mechanism for the pulley all of the parts are relieved from undue frictional contact except during their active operation, and hence they are only subjected to a minimum amount of wear.

Various modifications might be made in the form and construction of my new device without departing from the spirit or scope of the invention;

Therefore, without limiting myself to the exact embodiment herein shown and described, what I claim is:—

1. In a clutch-mechanism, the combination with the driving shaft, of a clutch-member fast on said shaft, a driving-member rotatable on the shaft and slidable thereon to engage the clutch-member, a sleeve slidable on the shaft to carry the driving-member into engagement with the clutch member, and means adapted to first engage the sleeve to carry it away from the driving-member and to then engage the driving-member to remove the latter from engagement with the clutch-member.

2. In a clutch mechanism, the combination with the driving-shaft, of a clutch-member fast on said shaft, a driving-member slidable on the shaft to engage the clutch-member, a sleeve slidable on the shaft, means to slide the sleeve to carry the driving-member into engagement with the clutch-member, and means movable to slide the sleeve away from the driving-member and to then slide the latter to carry it out of engagement with the clutch-member.

3. In a clutch-mechanism, the combination with a clutch-member, of a driving-member movable into and out of engagement with the clutch-member, means normally engaging said driving-member to hold the latter in engagement with the clutch-member, and means adapted to engage said first named means to carry it away from the driving-member and to then engage the latter to carry it out of engagement with the clutch-member.

4. In a clutch-mechanism, the combination with a driving-shaft, of a clutch-member fast on said shaft, a driving-member slidable on the shaft to engage the clutch-member, a sleeve slidable on the shaft to engage the driving-member, means to slide the sleeve to force the driving-member into engagement with the clutch-member, and a member normally free from engagement with the sleeve but adapted to engage the latter to release it from the driving-member and to then engage said driving-member to carry it out of engagement with the clutch-member.

5. In a clutch-mechanism, the combination with a driving-shaft, of a clutch-member fast on said shaft, a driving-member slidable on the shaft and having a hub formed with a peripheral flange, a sleeve slidable on the shaft and also formed with a peripheral flange, springs arranged to slide the sleeve to carry the driving-member into engagement with the clutch-member, and a member formed with lugs for engaging the sides of the flanges on the sleeve and driving-member to slide the latter, said lugs so arranged that the flange on the sleeve will be engaged first to move the sleeve away from the driving-member and to hold it from contact therewith after the driving-member is disengaged from the clutch-member.

6. In a clutch-mechanism, the combination with the driving-shaft, of a clutch-member fast on said shaft, a driving-member rotatable on the shaft and slidable thereon to engage the clutch-member, a sleeve slidable on the shaft to carry the driving-member into engagement with the clutch-member, said sleeve provided with a plurality of longitudinal pockets, springs mounted in said pockets to adapt them to slide the sleeve, and means to engage the sleeve to slide it against the action of the springs and to then engage the driving-member to remove the latter from engagement with the clutch-member.

7. In a clutch-mechanism, the combination with a bearing, of a shaft rotatable therein, a clutch-member fast on said shaft, a driving-member mounted free on the shaft between the clutch-member and the shaft-bearing, a sleeve slidable on the shaft between the driving-member and the bearing, a washer on the shaft abutting the end of the bearing, a plurality of springs arranged in pockets in the sleeve and adapted to bear on the washer to slide the sleeve to engage the driving-member with the clutch-member, and means to engage the sleeve and driving-member to carry the latter away from the clutch-member and to hold the sleeve from bearing against the driving-member.

8. In a clutch-mechanism, the combination with a rotatable shaft, of a clutch-member secured rotatively therewith, a driving-member having a hub mounted free to rotate on the shaft and formed with oil-pockets within its bore having radial holes leading therefrom to the outside of the hub and a circumferential groove at one end of the bore with longitudinal oil-ducts leading therefrom to the opposite end of the hub, said driving-member also formed with a cylindrical oil-chamber surrounding the hub and provided with radial blades therein arranged in line with the radial holes in the hub, a sleeve mounted free on the shaft and formed with longitudinal holes adapted to register with the longitudinal oil-ducts in the hub of the driving-member, resilient means to force the sleeve against the hub of the driving-member to carry the latter into engagement with the clutch-member, and means to slide the sleeve and driving-member on the shaft to carry the latter away from engagement with the clutch-member.

9. A clutch including a pair of engaging members, means for pressing the engaging members together, means for removing the pressure of said means from the engaging members, and means for thereafter disengaging the engaging members.

10. A clutch including a pair of engaging members, means for pressing the engaging members together, and means for removing the pressure of said means from the engaging members and for thereafter disengaging the engaging members.

In testimony whereof I affix my signature in presence of two witnesses.

SIMON W. WARDWELL.

Witnesses:
DANIEL MCNIVEN,
ARTHUR A. ARMINGTON.